Feb. 24, 1959  J. A. ROGERS ET AL  2,874,953
LINING FOR TITANIUM-CONTACTING APPARATUS
Filed Aug. 20, 1956
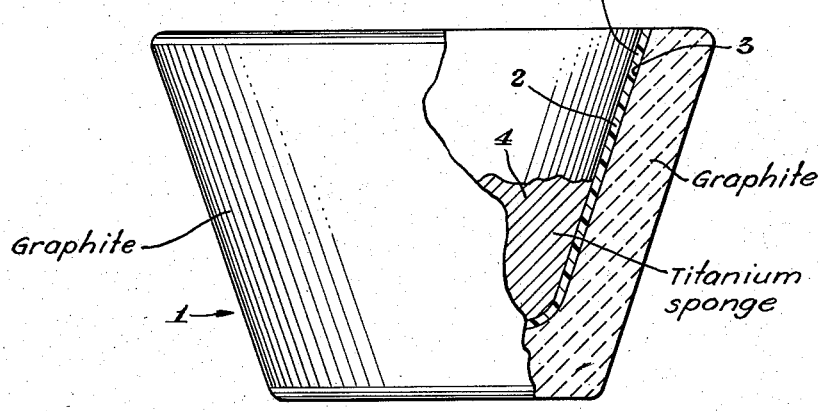
INVENTORS.
Jack A. Rogers
Paul R. Juckniess
BY
Griswold & Burdick
ATTORNEYS United States Patent Office
2,874,953
Patented Feb. 24, 1959

2,874,953
LINING FOR TITANIUM-CONTACTING APPARATUS

Jack A. Rogers and Paul R. Juckniess, Midland, Mich., assignors to The Dow Chemical Company, Midland, Mich., a corporation of Delaware Application August 20, 1956, Serial No. 605,161

2 Claims. (Cl. 266—43)

This invention is concerned with a lining for apparatus which contacts titanium and titanium compounds. It is especially concerned with protective linings for crucibles used in the production of metallic titanium from its compounds.

Titanium at advanced temperatures is highly reactive. Its reactivity with materials comprising the surfaces with which it comes in contact has long presented a problem. The reactivity of titanium with the surface materials of reaction and recovery vessels in the production of titanium presents a problem of particular concern.

Titanium is currently largely produced by reducing a titanium compound by a metal more electropositive than titanium, e. g., reducing titanium tetrochloride by magnesium or sodium. When these metals are used, the temperatures are quite high. In carrying out the reaction, the reducing metal, e. g., magnesium, is placed in a crucible and heated in an atmosphere of titanium tetrachloride vapor to the temperature at which the reduction proceeds. Such temperature renders the titanium highly reactive. The crucible must have a melting point well above reaction temperature and the inner surfaces thereof must be resistant to titanium attack at the reaction temperature. Among materials used for crucibles are steel and graphite. Steel has a number of disadvantages in comparison to graphite for use in crucibles. Titanium is highly reactive with iron and, therefore, steel crucibles are required to be lined with a material not so reactive with titanium which has a melting point well above the reaction temperature. Materials heretofore proposed for this purpose are molybdenum and tungsten. The titanium must be drilled out or bored out of the steel crucible so lined as by placing the crucible in a lathe. Graphite also has the advantage of possessing a higher melting point than steels.

Graphite crucibles, however, have presented serious problems because the graphite is somewhat reactive with titanium at high temperatures, although to a lesser extent than steel, rendering the titanium less ductile by the absorption of carbon. Graphite crucibles present a further problem because the graphite becomes so bonded to the metallic titanium on the cooling thereof that attempts to remove it therefrom entail considerable cost and inconvenience and result in high breakage of the crucibles.

Attendant upon these problems, the principal object of the invention is to provide a lined vessel which is substantially unreactive with titanium an its compounds at advanced temperatures and which does not form a strong bond with the titanium upon the cooling thereof in the vessel.

The method of overcoming this problem by the practice of the invention will be made clear by the following description, example, and appended claims.

The invention comprises applying a coating of phenolic type resin to the interior surfaces of graphite or carbon vessels, curing and baking the thus-applied coating in situ to render such vessels substantially resistant to attack by titanium and titanium compounds, and to permit ready release and removal of the titanium and its compounds from said vessels.

The attached drawing shows an elevational view, partially broken away to show internal structure, of a graphite crucible lined with a phenolic type resin in accordance with the invention.

This invention is not to be confused with known methods of bonding carbon or graphite granules such as is described in U. S. Patent 2,556,830 or of impregnating graphite electrodes as described in French Patent 286,316 or in Trans. Am. Inst. Eng. 35, 489–503 (1939).

The preferred phenolic resin employed in the invention is a thermosetting phenol-formaldehyde resin which is at an intermediary stage of condensation and which is referred to as a "B" stage phenolic resin. In general, such resins are prepared by the condensation of one molecular equivalent of a monohydric phenol, which is unsubstituted in at least one of the 2, 4, and 6 positions of the benzene nucleus, with between 1.0 and 2.5, preferably between 1.4 and 1.5, molecular equivalents of formaldehyde, and discontinuing the condensation reaction when the product becomes water-insoluble but still remains fluid.

The preparation of such phenol-formaldehyde condensation products is known and forms no part of this invention. However, the procedure used by us, in general, comprises mixing phenol and formaldehyde in the above ratio, heating to between 40° and 60° C., and admixing therewith about 1 to 2 percent by weight of an alkali such as sodium hydroxide. The temperature of the resulting reaction mixture is controlled to permit a rise to between 60° and 80° C. over a period of 65 to 80 minutes and is then held for an additional 3 hours to 5 hours at about 60° C.

The resulting mixture is then acidified by adding a strong mineral acid such as HCl or $H_2SO_4$. The reaction thereafter is continued at about 60° C. until the reaction mixture becomes substantially water-insoluble.

The partially condensed mixture so obtained is then cooled to about 30° C. and allowed to stand. During the cooling and standing periods, the resin settles in the water. A large portion of the water is then drawn off. The resin is then neutralized at this point by the addition of an alkali, e. g., sodium hydroxide, sodium carbonate, ammonium hydroxide, or potassium carbonate, and washed thoroughly with water. The resin and water mixture is allowed to settle several hours.

The rinse water which rises to the top during the settling period may be then largely removed as under a vacuum although the retention of as much as 20 to 35 percent water does not prevent the resin from being used at this stage directly in accordance with the invention. The resin at this stage of condensation is herein designated as a stage B resin.

The viscosity of the resin is not critical but is usually between 300 and 400 centipoises at 25° C.

A hardening agent in amount from 1 to 35 percent, based on the weight of the partially condensed resin, is now added. Suitable hardening agents are dichloroacetic acid, trichloroacetic acid, and benzene sulfonyl chloride. In addition to the hardening agent there may also be added a water-miscible solvent such as ethyl alcohol, butly alcohol, ethylene glycol, propylene glycol, acetone, or a mixture of such substances. The solvent is used to lower the viscosity to that which is best suited to the means of application of the resin to the graphite or carbon surface.

As the hardening agent, we prefer to use benzene sulfonyl chloride in an amount of about 5 parts based on 100 parts of the resin as the hardening agent. We also prefer to use acetone as the water-miscible solvent in an amount up to about 10 parts per 100 parts of the resin. After thoroughly mixing the hardening agent, solvent, and resin, the resulting mixture is then applied to the graphite or carbon vessel by brushing or spraying it evenly over the interior surfaces thereof. The thickness of the applied resin is not critical but care should be exercised to have all the interior surfaces covered. The resin is usually applied in sufficient thickness to give a resulting cured coating of about 0.01 inch thick. The thus-applied coating is cured for 0.5 to 3 hours at about room temperature. It is thereafter placed in an oven and the temperature raised at the rate of 15° C. per hour until 400° C. is reached, and is then cooled.

Referring to the drawing in more detail, there is shown an open crucible 1 of graphite, lined according to the invention with a continuous coating 2 of the phenol-formaldehyde resin intimately bonded to the interior surface 3 of the crucible, cured and baked in situ.

The following example illustrates a mode of carrying out the invention:

Phenol and formaldehyde were admixed, in a steam-heated reactor provided with an agitator and temperature control means, in a mole ratio of 1.42 moles of formaldehyde to 1 mole of phenol at room temperature. The mixture while being agitated was heated to about 47° C. To the mixture were then added 1.56 pounds of sodium hydroxide per 100 pounds of the mixture at a slow rate. The reaction was exothermic. The temperature was controlled so that it rose slowly to 65° C. after 70 minutes. The reactor and contents were then cooled to 60° C. and held at that temperature for 4 hours. After 4 hours the batch was cooled to 30° C. The product at this stage is known as a stage A resin. The stage A resin was dehydrated by vacuum means to 30 percent of the original volume.

To 100 gallons of the stage A resin, while being continuously agitated, were added 5¾ gallons of aqueous sulphuric acid consisting by weight of 7 parts of concentrated sulphuric acid and 19 parts of water. The ensuing reaction was exothermic resulting in considerable generation of heat.

The temperature of the mixture which rose due to the heat of the reaction was controlled so that it rose to 50° C. in 50 minutes from the beginning of the addition of the acid. The temperature was held at 50° C. for 2 hours. The reaction mixture was thereafter cooled to 30° C. over a period of 50 minutes.

The resin was then allowed to settle for 50 minutes and the water which had risen to the top was drawn off. To the resin were now added 1.25 pounds of sodium hydroxide, dissolved in 78 pounds of water, while continuing to agitate. The temperature was raised to 65° C. and held there for 1.5 hours. The contents of the reactor were then washed with water and then allowed to settle. After settling for 4 hours the water rose to the top and all water possible was drawn from the top of the resin so settled. The settled resin so obtained is the stage B resin.

To 100 parts by weight of the stage B resin were admixed 5 parts by weight of the hardening agent, benzene sulfonyl chloride. To the mixture thus formed were added 5 parts by weight of the water-miscible solvent, acetone, to serve as a vehicle. The mixture of resin, benzene sulfonyl chloride, and acetone so prepared was then ready for use as a coating material for the titanium apparatus, e. g., a graphite crucible.

The resin mixture thus prepared was applied as a substantially uniform coating layer to the interior surface of the graphite crucible of the type shown in the drawing, cured at room temperature for an hour, and thereafter heated to bring the temperature to 400° C. at a rate of 15° C. per hour and thereafter cooled.

The crucible thus lined in accordance with the invention, was then charged with magnesium metal pieces, and heated to 800° C. in a reaction chamber in an ambient atmosphere of an inert gas. When the magnesium was largely melted, titanium tetrachloride was slowly brought into contact with the magnesium in the crucible whereby the titanium tetrachloride was reduced to titanium sponge and magnesium chloride was formed. After the magnesium had replaced the titanium in the titanium tetrachloride, the megnesium chloride and any remaining magnesium metal were removed by vaporization leaving the titanium in situ, e. g., 4 of the drawing. After cooling, the titanium metal formed in the crucible was manually removed from the interior surfaces of the walls of the crucible without significant damage to the graphite crucible.

It is understood that the invention is not to be construed as being limited to the example. The phenol-formaldehyde partially condensed polymer employed in the invention may be at any stage of condensation which permits substantially even application on graphite or carbon surfaces. It is also to be understood that equivalent phenol-containing condensation products and polymers are within the scope of the invention.

Having thus described our invention, what we claim and desire to protect by Letters Patent is:

1. The process of preventing titanium sponge formed during the production thereof from adhering to the wall of a vessel containing it, composed of a material selected from the class consisting of graphite and carbon, which comprises bonding to the interior of said wall a lining formed by condensing a condensation mixture of phenol and formaldehyde to form a stage B resin, admixing therewith a hardening agent selected from the class consisting of dichloroacetic acid, trichloroacetic acid, and benzene sulfonyl chloride in sufficient amount to accelerate the rate of set of the thermosetting mixture after its application, adding to said mixture a water-miscible solvent in sufficient amount to impart a consistency appropriate for application of said mixture, applying said mixture substantially evenly over the interior surfaces of the crucible to be lined, curing the thus-applied mixture in situ at room temperature from 0.5 to 2 hours, and subjecting it to a rising temperature of about 15° C. per hour until a temperature of about 400° C. is reached.

2. The process of producing titanium metal consisting of coating a crucible composed of a material selected from the class consisting of graphite and carbon with a fluid stage B phenol-formaldehyde resin, curing the resin at room temperature for from 0.5 to 2 hours, subjecting it to a rise in temperature of about 15° C. per hour until a temperature of about 400° C. is reached, placing the crucible in a reaction chamber in an ambient atmosphere of an inert gas, charging it with magnesium, holding the temperature of the magnesium at about 800° C., slowly contacting the magnesium in the crucible with a titanium tetrahalide to form a reaction product of magnesium halide and titanium sponge, cooling the titanium and magnesium halide thus formed and removing it from the crucible, and thereafter separating the magnesium halide from the titanium sponge.

References Cited in the file of this patent

UNITED STATES PATENTS

| 1,675,735 | Stohr | July 3, 1928 |
| 1,846,853 | Ellis | Feb. 23, 1932 |
| 1,852,162 | Harris et al. | Apr. 5, 1932 |
| 2,315,432 | Kropa | Mar. 30, 1943 |
| 2,772,457 | Webbere | Dec. 4, 1956 |

FOREIGN PATENTS

| 481,069 | Great Britain | Mar. 4, 1938 |